United States Patent
Yang

(10) Patent No.: US 8,415,572 B2
(45) Date of Patent: Apr. 9, 2013

(54) STYLUS WITH BUTTON FUNCTION AND ELECTRONIC DEVICE HAVING SAME

(75) Inventor: Song-Ling Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 949 days.

(21) Appl. No.: 12/488,527

(22) Filed: Jun. 20, 2009

(65) Prior Publication Data

US 2010/0252337 A1    Oct. 7, 2010

(30) Foreign Application Priority Data

Apr. 2, 2009  (CN) .......................... 2009 1 0301323

(51) Int. Cl.
 *G06F 3/033*    (2006.01)
(52) U.S. Cl. ..................... 178/19.01; 345/179
(58) Field of Classification Search ............... 178/19.01
 See application file for complete search history.

(56) References Cited

U.S. PATENT DOCUMENTS

| | | | | |
|---|---|---|---|---|
| 6,198,440 B1 * | 3/2001 | Ha et al. | ........................ | 343/702 |
| 6,262,684 B1 * | 7/2001 | Stewart et al. | ................ | 343/702 |
| 6,366,247 B1 * | 4/2002 | Sawamura et al. | ........... | 343/702 |
| 6,911,943 B2 * | 6/2005 | Ryou et al. | ..................... | 343/702 |
| 7,626,582 B1 * | 12/2009 | Nicolas et al. | ................ | 345/204 |
| 2002/0190823 A1 * | 12/2002 | Yap | .............................. | 335/205 |
| 2003/0067452 A1 * | 4/2003 | Liu et al. | ........................ | 345/179 |
| 2006/0055686 A1 * | 3/2006 | Lee | ................................ | 345/179 |
| 2006/0094464 A1 * | 5/2006 | Kyou et al. | ................ | 455/556.1 |
| 2009/0128521 A1 * | 5/2009 | Chen | ............................. | 345/179 |

* cited by examiner

*Primary Examiner* — Alexander S Beck
*Assistant Examiner* — Kirk Hermann
(74) *Attorney, Agent, or Firm* — Altis Law Group, Inc.

(57) ABSTRACT

An electronic device comprises a main body and a stylus. The main body comprises a front cover, a conducting sheet, a conducting core, and a monitoring module. The front cover defines an elongated pocket. The conducting sheet is disposed in the elongated pocket. The conducting core is disposed in one end of the elongated pocket. The monitoring module electrically connected with the conducting sheet and the conducting core. The stylus received in the elongated pocket comprises an outer section, a conducting layer, and an inner section. The outer section comprises a tip and a stripped slot. The conducting layer is mounted on the stripped slot. The conducting layer is electrically connected with the tip. The inner section comprises a protrusion, the inner section is sleeved in the outer section, and the protrusion protrudes out of the second tube and slidably contacts with the conducts layer and the conducting sheet.

10 Claims, 3 Drawing Sheets

STYLUS WITH BUTTON FUNCTION AND ELECTRONIC DEVICE HAVING SAME

BACKGROUND

1. Technical Field

The present disclosure relates to a stylus for operating touch screens and an electronic device having the same.

2. Description of Related Art

Many current electronic devices, such as personal digital assistants (PDAs), use a touch screen and a stylus as an input means. When not used, the stylus is stored in a pocket of the electronic device. Thus maximum use of the stylus is not achieved.

What is needed, therefore, is a stylus and an electronic device having the same, which can overcome the above-described shortcomings.

DETAILED DESCRIPTION

Embodiments of the stylus and the electronic device will now be described in detail with reference to the drawings.

Figure 1:
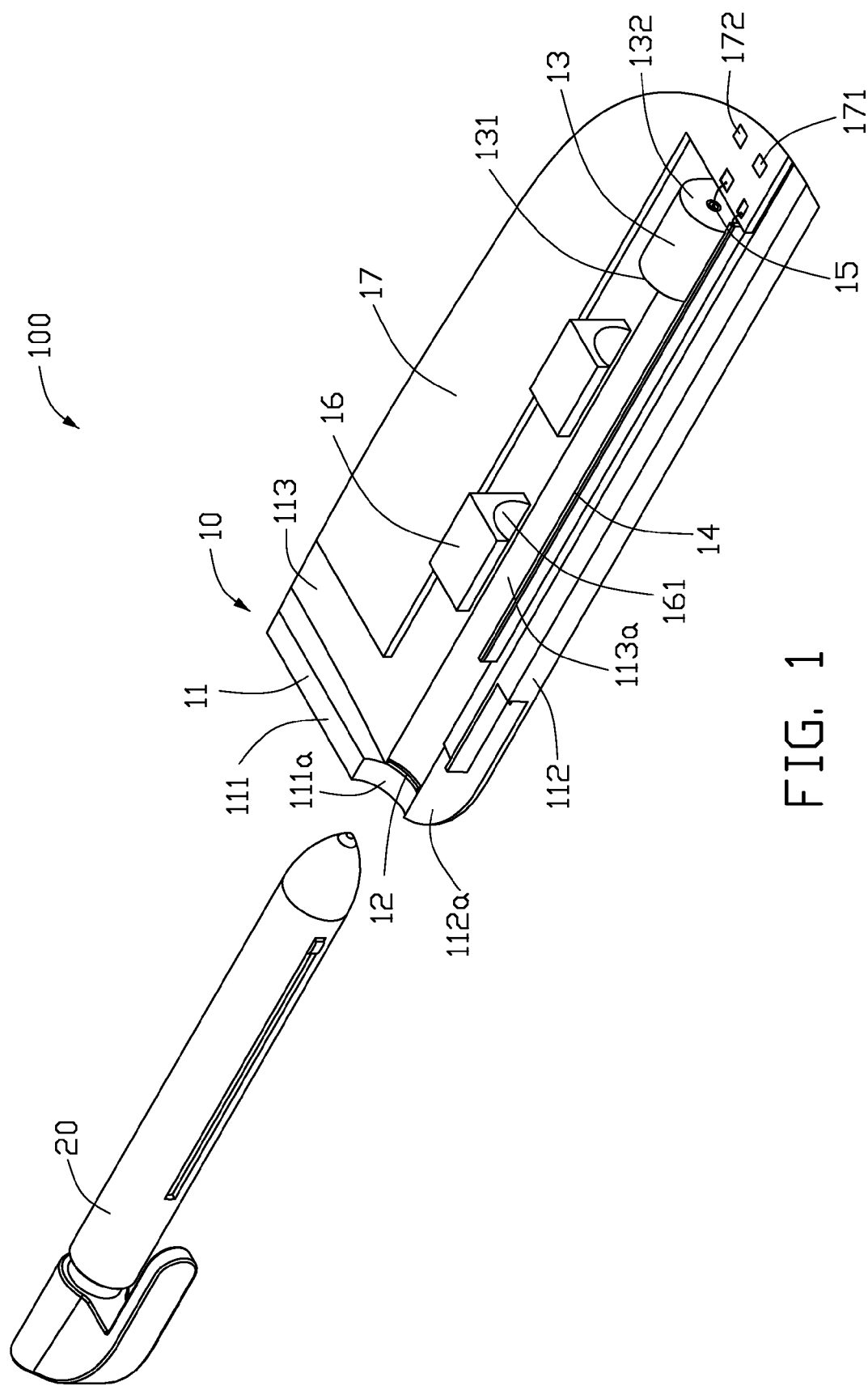
FIG. 1 is an isometric, exploded view of an electronic device having a stylus according to the present disclosure.

Referring to the FIG. 1, an electronic device 100, according to an exemplary embodiment, includes a main body 10 and a stylus 20. In the present embodiment, the electronic device 100 is a PDA.

The main body 10 includes a front cover 11, a stop half-ring 12, a stylus cap 13, a conducting sheet 14, a conducting core 15, two position blocks 16, and a circuit board 17.

The front cover 11 is a rectangular panel in shape, and includes a top end 111, a side surface 112, and a rear surface 113. The top end 111 defines an arc-shaped notch 111a adjacent to the side surface 112. The side surface 112 defines an L-shaped cutout 112a adjacent to the top end 111. The cutout 112a communicates with the notch 111a. The rear surface 113 defines an elongated pocket 113a substantially along the length of the front cover 11 and adjacent to the side surface 112. The elongated pocket 113a has an arc-shaped cross-section and communicates with the notch 111a and the cutout 112a.

The stop half-ring 12 is interposed between the elongated pocket 113a and the notch 111a. The inside diameter of the stop half-ring 12 is smaller than the outside diameter of the stylus 20.

The stylus cap 13 is a hollow cylinder in shape and includes an open end 131 and a close end 132. The stylus cap 13 is disposed in the elongated pocket 113a at an end way from the stop half-ring 12 and the open end 131 faces the top end 111.

The conducting sheet 14 is an elongated metal strip and is attached to one long inner sidewall of the elongated pocket 113a adjacent to the side surface. The conducting sheet 14 extends from the cutout 112a to the stylus cap 13.

The conducting core 15 is a metal cylinder in shape. The conducting core 15 is inserted through the center of the stylus cap 13.

Each of the position blocks 16 includes a cylindrical surface 161. The position block 16 is disposed on the rear surface 113, aligned at an edge of the elongated pocket 113a away from the conducting sheet 14. The cylindrical surface 161 faces the elongated pocket 113a.

The circuit board 17 includes a monitoring module 171 and a processing module 172. The monitoring module 171 and the processing module 172 are electrically connected to each other. The conducting sheet 14 and the conducting core 15 are electrically connected to the monitoring module 171. The monitoring module 171 is configured for measuring resistance between the conducting sheet 14 and the conducting core 15 and generates a signal. The processing module 172 is configured for controlling the main body 10 according to the signal.

Figure 2:
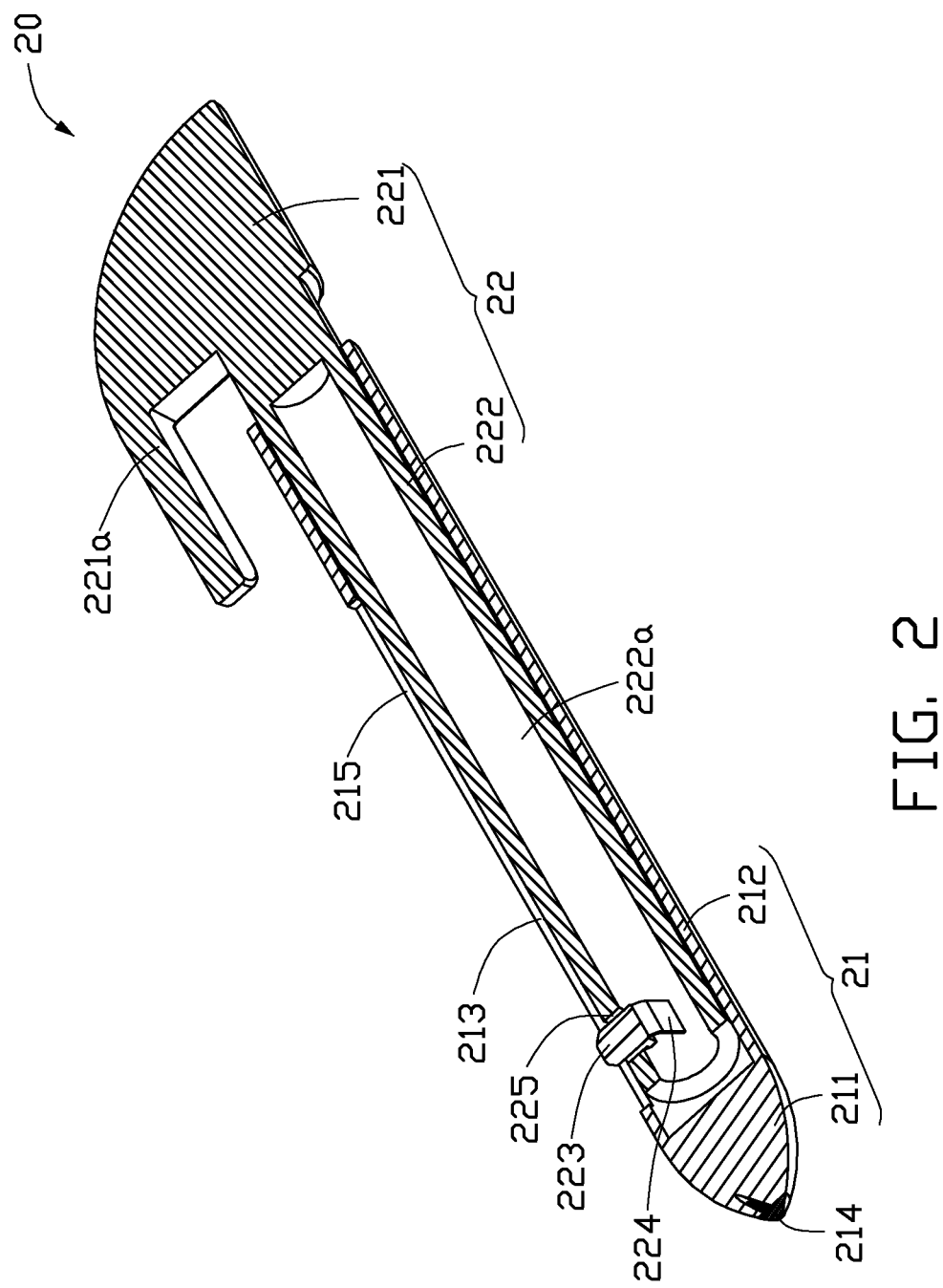
FIG. 2 is an isometric, cross-sectional view of the stylus of FIG. 1.

Referring to the FIG. 2, the stylus 20 includes an outer section 21 and an inner section 22.

The outer section 21 is in a form of sleeve, and includes a rear end 211, a first tube 212, and a conducting layer 213. The rear end 211 is generally a cone in shape and is connected to one end of the first tube 212. The rear end 211 includes a tip 214. The tip 214 is formed at peak of the rear end 211. The first tube 212 is an annulated column and defines a stripped slot 215 along the length of the first tube 212. The stripped slot 215 includes a first side surface (not shown). The conducting layer 213 is formed on the first side surface. The conducting layer 213 is electrically connected with the tip 214.

The inner section 22 is also in a form of sleeve. The inner section 22 includes a front end 221, a second tube 222, a protrusion 223, and a spring plate 224. The front end 221 is connected to one end of the second tube 222. The front end 221 includes a clip part 221a. The clip part 221a is L-shaped and one end faces the second tube 222. The second tube 222 is an annulated column and includes an inner wall 222a. The second tube 222 defines a through hole 225. One end of the spring plate 224 is fixed to the inner wall 222a. The protrusion 223 is mechanically connected with the other end of the spring plate 224, and protrudes out of the second tube 222 from the through hole 225.

In assembly, the protrusion 223 is pressed into the through hole 225. Then the second tube 222 is inserted into the first tube 212. The protrusion 223 protrudes from the through hole 225 and into the stripped slot 215 and electrically contacted with the conducting layer 213.

Figure 3:
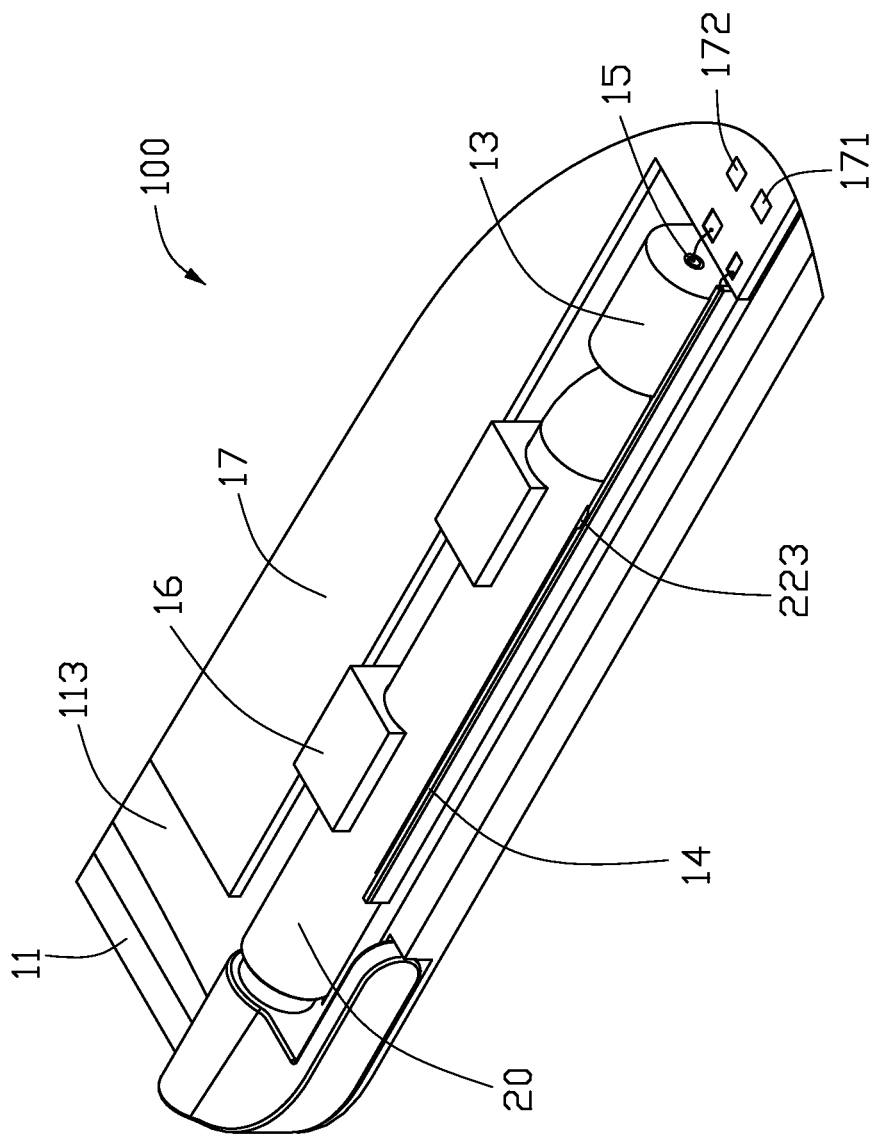
FIG. 3 is an isometric, assembled view of the electronic device according to the present disclosure.

Further referring to the FIG. 1 and FIG. 3, before use, the stylus 20 is receivably pushed into the elongated pocket 113a. The stylus 20 is secured by the position blocks 16 and the stylus cap 13. The outer section 21 is stopped by the stop half-ring 12. The clip part 221a is latched in the cutout 112a. The tip 214 is electrically contacted with the conducting core 15. The protrusion 223 is electrically contacted with the conducting sheet 14.

The conducting sheet 14, the protrusion 223, the conducting layer 213, the tip 214, the conducting core 15, and the monitoring module 171 form electrical loop.

In use, the stylus 20 is slid out from the elongated pocket 113a with an external force. Initially, the outer section 21 is restricted by the stop half-ring 12. The outer section 21 remains unmovable. As the inner section 22 moves into the outer section 21, the protrusion 223 moves into the stripped slot 215. Therefore the resistance between the conducting sheet 14 and the conducting core 15 changes.

The monitoring module 171 measures a changing of the resistance value between the conducting sheet 14 and the conducting core 15 and transforms it into a control signal. The monitoring module 171 transmits the control signal to the processing module 172 can selectively control the electronic device 100 based upon the control signal. For example, the control signal can be used to turn a page of an ebook or increase the volume of the speakers on the electronic device 100.

When the protrusion 223 reaches the end of the stripped slot 215, if the external force to the outer section 21 exceeds the resisting force of the stop half-ring 12, the user can draw out the stylus 20 from the elongated pocket 113*a*. The stylus 20 can be utilized to operate the screen (not shown).

In this embodiment, when a user reads the ebook displayed on the screen of the electronic device 100, the user may want to turn the page. At this time, the user can draw the inner section 22 out from the outer section 21. Meanwhile, the monitoring module 171 detects an increase of the resistance value and generates a control signal. The processing module 172 controls the electronic device 100 to turn the page of the electronic book based upon the control signal. When the user pushes the inner section 22 into the outer section 21, the page of the electronic book is unchanged.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention

What is claimed is:

1. An electronic device comprising:
   a main body comprising:
      a front cover defining an elongated pocket;
      a conducting sheet attached to the inner sidewall of the elongated pocket, the length of the conducting sheet being parallel to that of the elongated pocket;
      a conducting core disposed in the elongated pocket and located at one end of the elongated pocket; and
      a monitoring module electrically connected with the conducting sheet and the conducting core and configured for measuring a resistance between the conducting sheet and the conducting core, and transforming a changing of the resistance into a control signal;
      a processing module configured to control the electronic device to execute a predetermined function according to the control signal; and
   a stylus comprising:
      an outer section comprising a tip in contact with the conducting core and a first tube slidably received in the elongated pocket, the first tube defining a stripped slot therein along the length of the first tube;
      a conducting layer formed on the stripped slot, the conducting layer being electrically connected with the tip; and
      an inner section comprising a second tube sleeved by the first tube and a protrusion, the protrusion protruding out of the second tube and extending through the stripped slot of the first tube for electrically and slidably contacting the conducting layer and the conducting sheet;
      wherein the conducting sheet, the protrusion, the conducting layer, the tip, the conducting core, and the monitoring module forms an electrical loop.

2. The electronic device as claimed in claim 1, wherein the front cover comprises a top end, a side surface, and a rear surface; the top end defines a notch; the side surface defines a cutout; the elongated pocket is defined in the rear surface; and the elongated pocket communicates with the notch and the cutout.

3. The electronic device as claimed in claim 1, wherein the main body further comprises a stop half-ring; and the stop half-ring is interposed between the elongated pocket and the notch.

4. The electronic device as claimed in claim 3, wherein the main body further comprises a stylus cap; the stylus cap is disposed in the elongated pocket at an end away from the stop half-ring; and the conducting core is inserted through the center of the stylus cap.

5. The electronic device as claimed in claim 1, wherein the main body further comprises at least one position blocks; the position block is disposed in the front cover; the position block comprises a cylindrical surface; and the cylindrical surface faces the elongated pocket.

6. The electronic device as claimed in claim 1, wherein the outer section comprises a rear end; the tip is formed at the peak of the rear end.

7. The electronic device as claimed in claim 1, wherein the inner section comprises a second tube; a through hole is defined on the second tube; and the protrusion protrudes from the through hole.

8. The electronic device as claimed in claim 7, wherein the inner section comprises a spring plate; one end of the spring plate is disposed on the second tube, and the other end is fixed to one end of the protrusion.

9. The electronic device as claimed in claim 2, wherein the inner section further comprises a clip part; and the clip part is latched in the cutout.

10. A stylus comprising:
   an outer section comprising a tip and a first tube, the first tube defining a stripped slot therein along the length of the first tube;
   a conducting layer formed on the stripped slot, the conducting layer being electrically connected with the tip; and
   an inner section comprising a second tube sleeved by the first tube and a protrusion, the protrusion protruding out of the second tube and extending through the stripped slot of the first tube for electrically and slidably contacting the conducting layer.

* * * * *